(12) United States Patent
Arnold

(10) Patent No.: US 7,398,998 B2
(45) Date of Patent: Jul. 15, 2008

(54) WIRE, WIRE ROPE OR CABLE ASSEMBLIES FOR SEAT BELT COMPONENT

(75) Inventor: David R. Arnold, Macomb, MI (US)

(73) Assignee: Key Safety Systems, Inc, Sterling Heights, MI (US)

( * ) Notice: Subject to any disclaimer, the term of this patent is extended or adjusted under 35 U.S.C. 154(b) by 251 days.

(21) Appl. No.: 10/626,952

(22) Filed: Jul. 25, 2003

(65) Prior Publication Data

US 2005/0017495 A1  Jan. 27, 2005

(51) Int. Cl.
*B60R 22/28* (2006.01)
*B60R 22/46* (2006.01)

(52) U.S. Cl. ............ 280/805; 280/806; 280/801.1

(58) Field of Classification Search ........... 280/806, 280/805, 801.1; 60/638, 632; 188/374, 371; 297/480; 427/313, 329, 433, 434.6
See application file for complete search history.

(56) References Cited

U.S. PATENT DOCUMENTS

| | | | | |
|---|---|---|---|---|
| 2,561,487 A | * | 7/1951 | Bailhe | 114/230.26 |
| 2,855,215 A | * | 10/1958 | Sheren | 280/801.1 |
| 3,318,082 A | * | 5/1967 | Riggs | 57/217 |
| 4,243,118 A | * | 1/1981 | Landry | 182/3 |
| 4,575,120 A | * | 3/1986 | Volk et al. | 280/804 |
| 5,517,877 A | * | 5/1996 | Hancock | 188/371 |
| 5,897,140 A | * | 4/1999 | Wier | 280/806 |
| 6,094,913 A | * | 8/2000 | Wier | 60/638 |
| 6,095,615 A | * | 8/2000 | Wier | 297/480 |
| 6,113,145 A | * | 9/2000 | Evans | 280/806 |
| 2005/0017567 A1 | * | 1/2005 | Sachs et al. | 297/468 |

\* cited by examiner

*Primary Examiner*—Ruth Ilan
(74) *Attorney, Agent, or Firm*—Markell Seitzman

(57) ABSTRACT

A vehicle occupant restraint system including: a seat belt pretensioner comprising a curved cable guide and a flexible cable, having a determinable stiffness to bending, positioned about and movable relative to the cable guide. One end of the cable is adapted to be connected to a piston for moving the cable (or alternately to a static anchor) and an opposite end of the cable adapted to be operably connected to a seat belt buckle, a portion of the cable impregnated with a first material to increase the stiffness of the cable, the cable configured to be drawn into the cable guide and to dissipate energy as it is so moved. Additionally, the first material covers the exterior of the cable and is of determinable thickness.

15 Claims, 5 Drawing Sheets

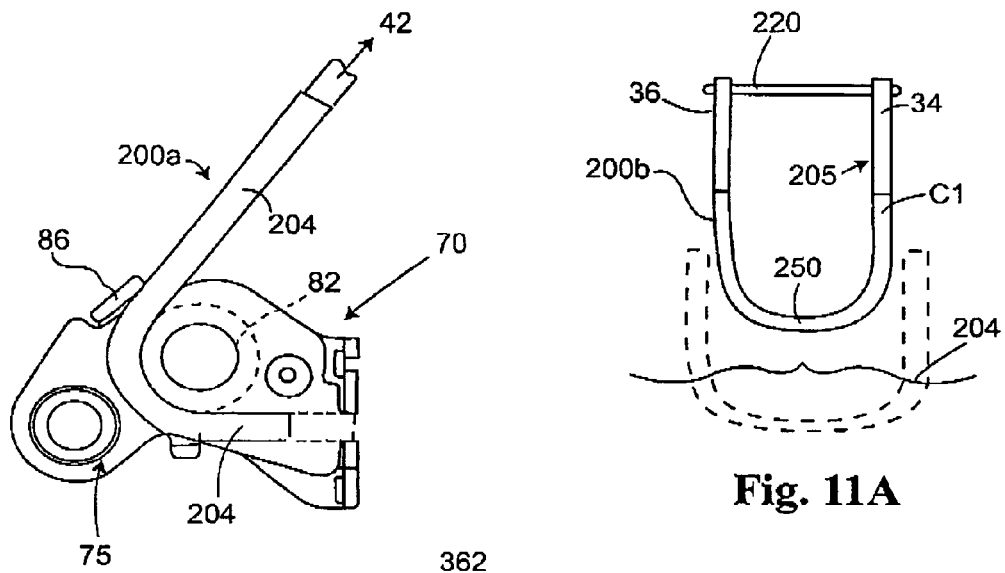
Fig. 10
Fig. 11A
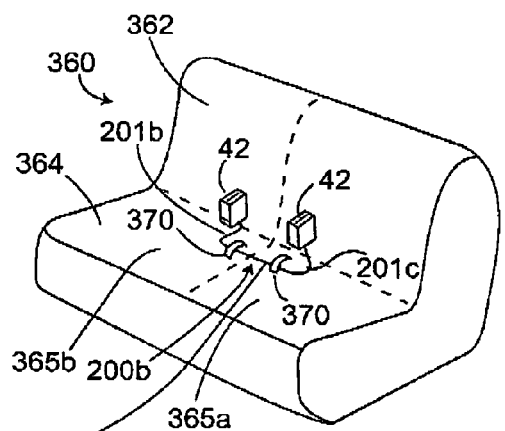
Fig. 11B
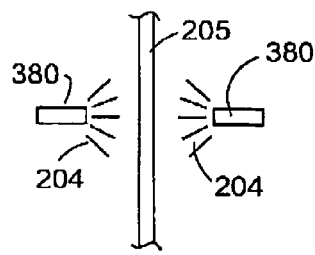
Fig. 12
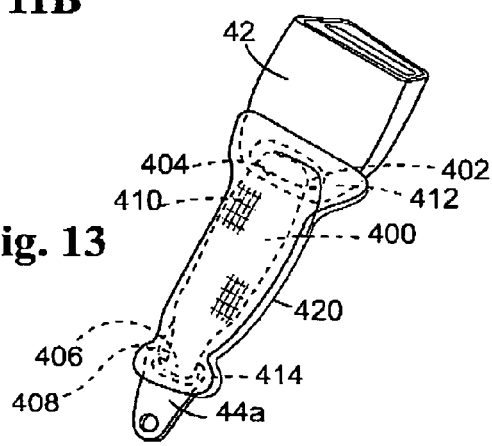
Fig. 13

WIRE, WIRE ROPE OR CABLE ASSEMBLIES FOR SEAT BELT COMPONENT

BACKGROUND AND SUMMARY OF THE INVENTION

The invention generally relates to ropes, wires (cables), wire ropes and assemblies thereof (also referred to as a cable or cable assembly). Additionally, the invention more specifically relates to a wire, wire rope, cable or cable assemblies useable with safety restraint products including seat belt buckle assemblies and pretensioners (which are also referred to in the art as belt tighteners).

Reference is made to FIGS. 1 and 2, which illustrate the construction of a typical wire rope (cable) 20. The wire rope 20 typically includes a core 22, which can be a solid wire or of a multi-strand construction of small diameter wires. The core 22 can be metal, a resin-based material or a naturally occurring material such as wood, cotton, etc. The wire rope or cable 20 additionally includes a plurality of exterior strands 24 wound about the core 22. In many applications, each exterior strand 24 can be formed of a plurality of thin wires 26 or by a single wire. For the purpose of illustration, the wire rope 20 shown in FIGS. 1 and 2 is of conventional construction and comprises a multi-wire stranded core 22 and five external multi-wire strands 24 twisted about the core 22. The lay of the wires relative to each strand as well as the lay of each strand 24 relative to the core 22 will vary with application. The number of wires in a given strand, as is known in the art, will vary from about 3-19.

Additionally, each strand 24 and each wire 26 (of a strand) has a general circular cross-section (see in FIG. 2), however other individual wire (and strand) cross-sectional shapes are acceptable for the present invention.

As can be seen from FIG. 2, there will, in general, exist small spaces 27 between adjacent strands as well as smaller spaces 27a between each adjacent individual wire 26. This spacing typically arises because of the arcuate (circular) cross-sectional shape of the individual wires 26 in each strand 24 as well as the composite shape of each strand 24. As can be appreciated, as the diameter of each of the individual wires 26 is reduced the overall shape of the strands 24 becomes more circular. For the purpose of illustration, each of the multi-wire strands 24 in FIG. 2 is surrounded by a line 32. In one context, the line 32 is an approximation of the general outer circular shape of each strand 24 formed using multiple wires 26. If however, the wire rope cable 20 is made up of a solid core surrounded by solid exterior strand wires (in place of the multi-wire strands), then the line 32 would, of course, show the actual profile of each wire/strand. However, even with the use of solid strands (each with an arcuate cross-sectional shape) the intra-strand spacing 27 will continue to exist.

Returning to FIG. 1, any segment (regardless of length) of wire rope/cable 20 will generally include a first end 34 and an opposite or second end 36, which can be connected to a variety of cooperating mechanisms or couplings in a variety of ways. The length of any segment of wire rope will vary with application.

Reference is briefly made to FIG. 3, which illustrates one known type of application for a wire rope or cable 20 as part of a seat belt system and more particularly as part of an anchor mechanism or seat belt buckle presenting mechanism (for a seat belt buckle 42). In this application, end 36 is connected to a buckle anchor via a ferrule (or some other connection or termination mechanism) 40, which in turn is connected to or is part of a seat belt buckle 42. Opposite end 34 of the segment of wire rope 20 is connected to a floor anchor mechanism 46, which may include another ferrule 44. This arrangement permits the wire rope 20 to be anchored to a structural component of the vehicle, such as the vehicle floor 48 or seat 50). As is known in the art the buckle 42 is mounted adjacent a vehicle seat 50 and positioned at or held at a preferred orientation. One of the benefits of using a wire rope, even a thin rope, is that it is lightweight and extremely strong when subjected to tension forces. However, in seat belt applications if the overall gauge of the wire rope 20 is relatively thin the wire rope will obviously be flexible and will bend even when loaded by a typical seat belt buckle. For example, a seat belt buckle is often anchored by wire ropes having diameters in the range of 2.0-4.0-6.0 mm, which show a propensity to easily bend.

In the configuration of FIG. 3, the seat belt buckle 42 will fall (as an unsupported thin wire rope 20 will bend under the weight of the buckle) to a position illustrated by phantom line 51. To maintain the seat belt buckle in its in desired orientation relative to the seat 50 and to prevent the wire rope 20 from bending, it is common practice to surround the cable with a semi-rigid plastic sleeve or jacket shown by phantom line 52. In essence, the plastic sleeve 52 presents the seat belt buckle 42 in a desired orientation. As will be seen below, one of the advantages of the present invention is the elimination of the need for a sleeve 52 while retaining the ability to present the buckle at known orientations. One of the further disadvantages of wire rope of the type illustrated in FIGS. 1 and 2 is that it has a "memory", that is, it will not easily take a permanent curvature and therefore easily returns to its original shape after it is bent.

Reference is made to FIG. 4, which shows another use for a wire rope or cable assembly such as 60, which has been incorporated into a known type of seat belt tightener 70 (also referred to in the art as a pretensioner). In a broad sense a pretensioning mechanism also anchors the seat belt buckle. This cable assembly 60 comprises the wire, wire rope or cable 20 terminated at one end 36 at the buckle anchor 40, which is connected to or is formed as part of a frame of a seat belt buckle 42. The other end 34 of the cable 20 is terminated at a piston 68. The pretensioner 70, which is of known design, additionally comprises a tubular housing 72 (which supports the piston) extending from a propellant or generant housing 74 and a bracket section 75. Mounting bracket section 75 is connected to the generant housing 74. A quantity of propellant 76 is located within the generant housing 74 such that when the propellant burns the gases produced propel the piston 68 rapidly down the tube 72, forcibly pulling the cable 20 into the pretensioner 70, which pulls the buckle 42 toward the pretensioner. The downward movement of the buckle reduces slack in the seat belt (not shown) about the occupant. The operation of pretensioners is well known.

Characteristically many buckle belt tighteners such as 70 include a direction changing mechanism 80 such as a pulley, pulley wheel or pulley segment, all of which are denoted by numeral 82. The pulley 82 is secured to or is part of the bracket section 75. As can be seen, the medial section 84 of the cable 20 is looped about (in contact with, threaded through) the pulley 82. The pretensioner 70 includes a guard(s) 86 that functions to prevent the cable from moving off from the pulley 82. In some pretensioners the guard 86 is realized by stand-offs or stops, which are formed (often as bent tabs) as part of the bracket 75 or as part of the pulley 82. These stand-offs or guards 86 define, in cooperation with the pulley 82, a channel in which the cable 20 resides and, as mentioned, the stand-offs or guards maintain the flexible cable in proximity to the surface of the pulley. U.S. Pat. No. 5,911,440 shows one prior buckle pretensioner. Additionally, as can be appreciated, the placement of the guards 86 about the pulley defines the departure angles the cable 20 makes with the pulley. In use within a pulley, the initially straight though flexible cable is easily bent by hand and positioned about the pulley. The channel for the cable can also be machined into mating pretensioner parts as shown in Canadian patent 2158901.

The typical belt tightener (pretensioner) such as 70 will move the buckle a distance to 100 mm within a few milliseconds. As can be appreciated the seat belt buckle experiences extremely high levels of acceleration as the buckle begins to move and subsequent high levels of deceleration as it is brought to a rapid stop (when the piston stops moving or as the buckle engages the bracket 75). To lessen the magnitude of the deceleration to which the buckle is subjected at the end of the pretensioner stroke, the prior art has proposed the use of energy absorption (also called energy dissipation) mechanisms. These mechanisms operate to reduce the velocity (and hence the terminal level of deceleration) the buckle experiences.

The pretensioner 70 of FIG. 4 includes one such energy absorbing mechanism in the form of a thin-walled tube 90, which is made as an integral part of ferrule 40. This tube can also be a separate part positioned loosely about the cable and might be located remote from the ferrule 40. As the ferrule 40 is pulled into contact with the pulley 82 and pulley housing/bracket 75, the tube 90 deforms.

The prior art shows the thin-walled tubing 90 bending along predefined regions as though it were a bellows but not entering the spacing or channel 87 between the guards, tabs or stands-offs 86 and the pulley 82 (or the pulley housing 80). Other proposals permit the thin-walled tubing such as 90 to be pulled into the curved channel 87 in the bracket 75 and dissipate energy as the tube is pinched or diametrically bends as it enters the channel narrower between the bracket 75 and the pulley 82.

It is an object of the present invention to provide an improved rope, wire rope or cable assembly. A further object of the present invention is to provide a method of increasing the stiffness of all or a portion of the wire rope or a segment thereof. A further object of the present invention is to incorporate a wire rope of predetermined stiffness that dissipates energy as the increased stiffness portion of the wire rope is pulled around a pulley. It is a further object of the invention to provide an improved pretensioner or improved anchor assembly.

Accordingly the invention comprises: an improved wire rope or cable or an assembly including such a rope or cable. Additionally, the invention includes various devices which use such a cable or cable assembly including a vehicle occupant restraint system having a seat belt pretensioner comprising a curved cable guide and a flexible wire rope or cable, the rope or cable having a determinable stiffness to bending, positioned about and movable relative to the cable guide, one end of the cable (or wire rope) adapted to be connected to a first means for moving the cable and an opposite end of the cable adapted to be operably connected to a seat belt buckle, a portion of the cable configured to be drawn into the cable guide, such portion being impregnated with a first material to increase the stiffness of the cable.

Many other objects and purposes of the invention will be clear from the following detailed description of the drawings.

BRIEF DESCRIPTION OF THE DRAWINGS

In the drawings:
FIG. 10 shows a preformed wire rope segment.
FIGS. 11A and 11B show the present invention within rear seat belt assembly.
FIG. 12 shows an alternate method of coating a wire rope cable.
FIG. 13 shows a further embodiment of the invention applied to a seat belt webbing.

DETAILED DESCRIPTION OF THE DRAWINGS

Figure 3:
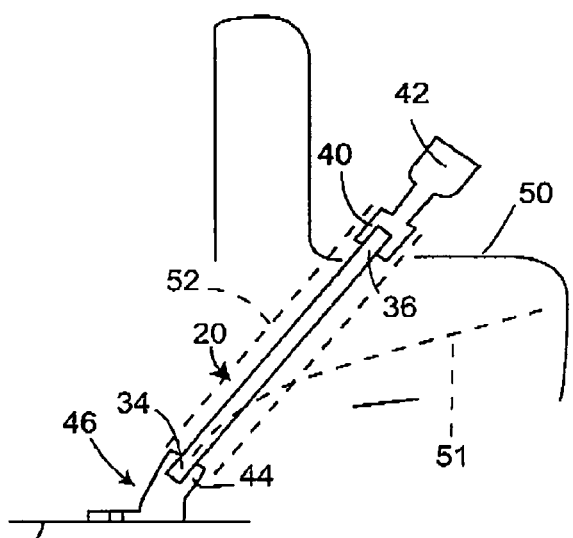
FIG. 3 shows a typical prior art seat belt installation.
Figure 4:
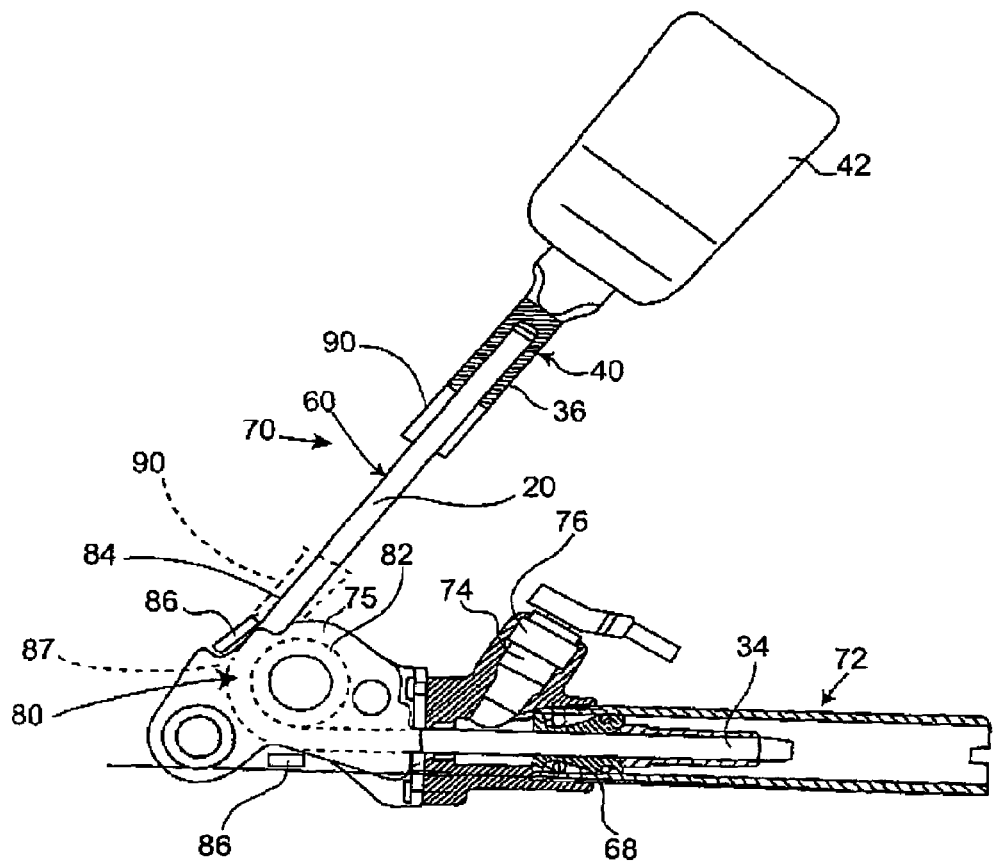
FIG. 4 shows a prior art seat belt tightener (pretensioner) that utilizes a conventional wire rope (or cable).

The present invention provides means for controllably increasing the stiffness of an untreated wire rope (cable) such as 20, permitting the enhanced wire rope (cable) to be used in an anchoring mechanism, such as shown in FIG. 3, without the need to use an energy absorbing or crushable sleeve in the environment of FIG. 4.

Figure 5:
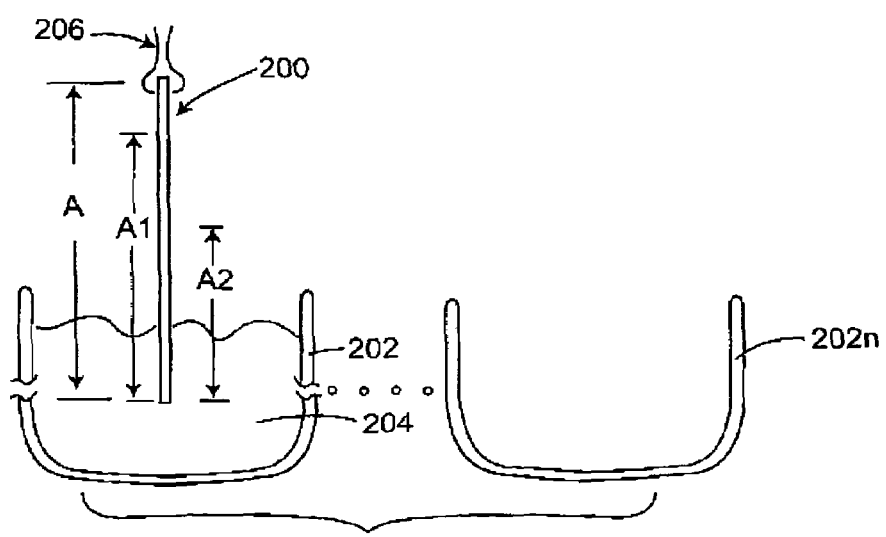
FIG. 5 illustrates a step of a method in making an improved wire rope.

Reference is made to FIG. 5, which illustrates a method of treating a segment of a conventional metal rope (cable) 20. The treated, improved wire rope is designated by numeral 200. In general, the invention contemplates taking an untreated length or segment of rope, wire rope or cable 20, cleaning at least that portion of the cable 20 to be covered by a filling or coating material 204 and then applying one or more layers of coating material to the cable 20 or portion(s) thereof. In the context of the present invention, the coating material, that is solder, will fill the intra-wire and intra-strand spaces as well as coat the cable 20. The solder will be drawn into the intra-wire and intra-strand spaces by capillary action. Once the intra-wire and intra-stand spaces are filled it becomes irrelevant how many times the fill or coating material is applied to the exterior of the cable 20. The fill or coating material 204 will cover the exterior of the cable 20, protecting it from contamination; additionally, the coating (fill) material will fill the intra-strand and intra-wire spaces 27 and 27a respectively. In the preferred embodiment of the invention the cable 20 is generally constructed of a material to which a chosen type of solder will adhere; in essence the cable is primarily metallic. In the context of the present invention the fill and coating material 204 are one and the same material but this may not be the case. For example, the wire can be dipped in a first type of solder having a known melting point and cooled. This first type of solder will fill the intra-wire and intra-strand spaces and apply a thin coating to the outer portions of the strands 24. Thereafter, an application of a second type of solder can be applied to the wire; this second type of solder will have a lower melting point and will not disturb the first solder in the intra-wire and intra-strand spaces. This second solder will primarily re-coat the exterior of the cable. The new mechanical characteristics of the coated cable 200 can be tailored by choosing the characteristics of the different fill and/or coating material used.

With solder as the covering material 204, the length of the wire segment 20 is pre-treated with flux, which serves as the cleaner. The invention contemplates that the wire segment 20 of desired length can be dipped into the cleaner (flux) or, alternatively, the cleaner can be sprayed on the wire or cable segment 20 or the cleaner can be wiped onto the wire cable 20. Other coating materials and cable materials may also require a different type of surface preparation.

In the embodiment shown in FIG. 5 the untreated or native wire rope or cable segment such as 20, of length A, is immersed one or more times in one or more vat(s) 202 to 200$n$ (or treatment tank) of liquid coating material (in this case molten solder 204) to coat the immersed portion of the wire cable 20. The solder, and in general other coating materials, will coat the wire rope or cable 200 or the selected portions thereof, with a thin, generally flexible, coating that is impervious to air, water and other contaminants. Depending upon the amount of solder and/or alloy used (coating material) 204 covering the cable 200, the cable 200 will become more difficult to bend (or straighten or twist), as the case may be. A wire rope or cable 200 that is more resistant to bending can be used in the environment of FIG. 3 and might eliminate the need for a plastic sleeve, which previously served as a support mechanism for the bendable untreated cable 20. An additional benefit of the present invention is the coated wire rope 200 can be shaped into various shapes and it will retain the selected shape. In contrast, the untreated wire rope or cable 20 will generally return to a straight configuration. Depending on the physical characteristics of the wire rope/cable 20 and the quantity and/or alloy of solder 204 applied, the treated wire rope will be able to support items of differing weight placed at an end of the cable 200. As the invention is using the coated cable is in conjunction with an automotive belt, the solder (or resin or epoxy) used should be pliable within a temperature range of −40 degrees F. and 120 degrees F.

As will be seen below a coated wire rope 200 also has increased advantages when used, for example, within a belt tightener. It should be appreciated that virtually all types of naturally occurring or synthetic ropes, metal wires (including single strand), or solid ropes or wires, as well as more complicated multi-bundled wires or ropes can be used with and will also benefit from the present invention. Additionally, materials other than solder can be used to increase the rigidity of the rope, wire rope or cable whether or not made of multiple strands or of a simple solid wire.

The solder (coating material) 204, is maintained in liquid form within a treatment tank 202, enters into the inter-wire spaces 27$a$ (also the inter-strand spaces 27 and coats the exterior of the segment of cable 20 to be treated. Subsequently, the coating material 204 (solder) will cool and harden to its semi-solid form. Depending on the material used to make the uncoated wire rope or cable 20, different solders can be used. Solder can be made of one or more materials including lead, tin, silver, bismuth or a combination of materials such as tin/silver, tin/antimony, or tin/copper/selenium. Each solder has a different strength as well as differing melting temperature.

Figure 1:
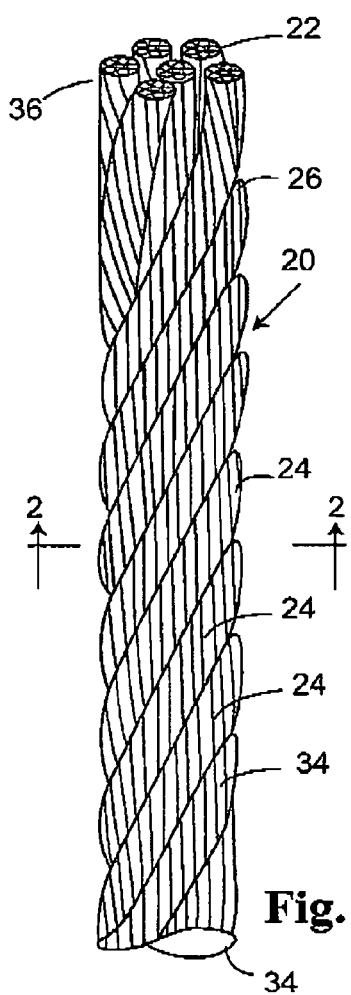
FIGS. 1 and 2 illustrate a prior art wire rope/assembly.
Figure 2:
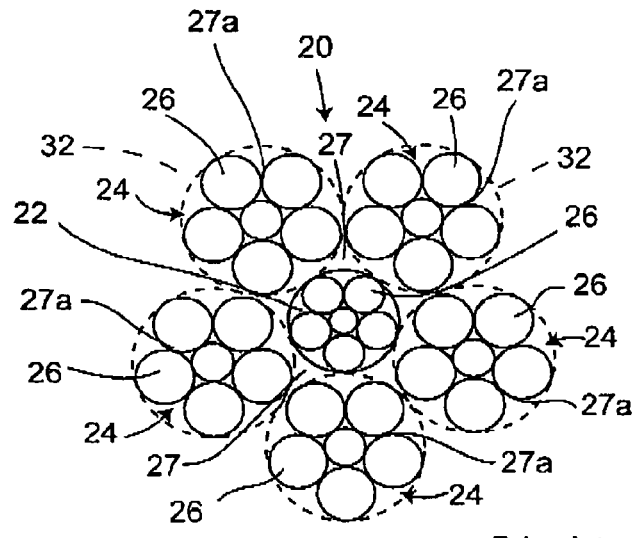

While the preferred embodiment uses solder 204, other resinous material such as plastic resins, epoxies, copper, or antimony can be used to coat the wire rope and to fill the inter-wire 27$a$ and inter-strand 27 spaces to make the treated portion of wire rope 200 more resistant to being bent, or twisted or straightened, as the case may be. As mentioned above, the center strand or core of a multi-strand cable (such as that shown in FIGS. 1 and 2) can be made using a synthetic or naturally occurring fiber rather than a metal wire. Consequently, the chosen coating material will be capable of adhering to the fiber core and to the surrounding strands (or wires).

Figure 6:
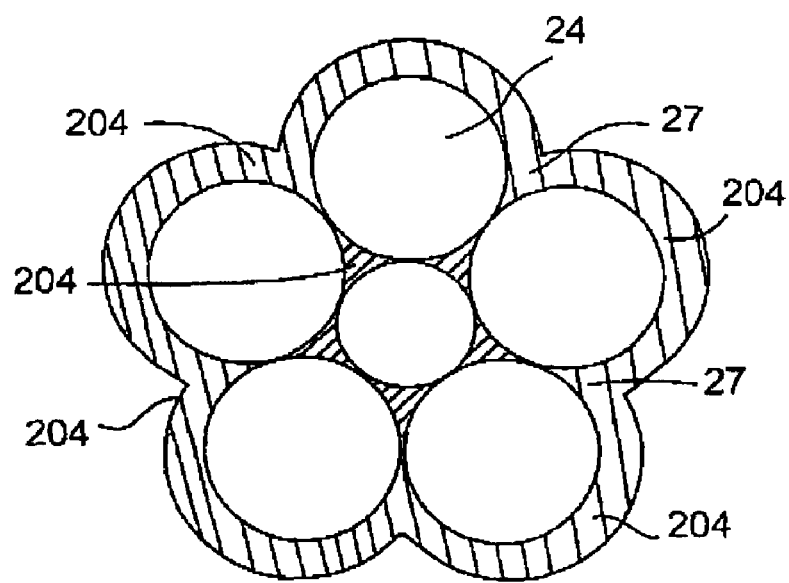
FIG. 6 is a cross-sectional view of an exemplary, improved wire rope.

The rope segment 200 is left in the liquid (solder) 204 (or other coating material) a sufficient amount of time to permit the liquid to fill the inter-strand or inter-wire spaces 27, 27$a$ as shown in FIG. 6. Thereafter, the rope segment 200 is removed from the liquid 204, it can be agitated, if needed, to remove excess liquid (solder) and permitted to dry or cool (depending on the characteristic of the coating material being used). As the solder cools it returns to its room temperature, flexible, semi-solid state. In general it may be said the solder "hardens," which in general is also characteristic of resinous (epoxy) materials. Those portions of the wire segment 200 treated with solder are now significantly more stiff than untreated portions. One specific advantage of solder is that when it hardens it is not brittle and may be less susceptible to chipping or breaking of the cable 20 when the cable is bent.

Figure 7:
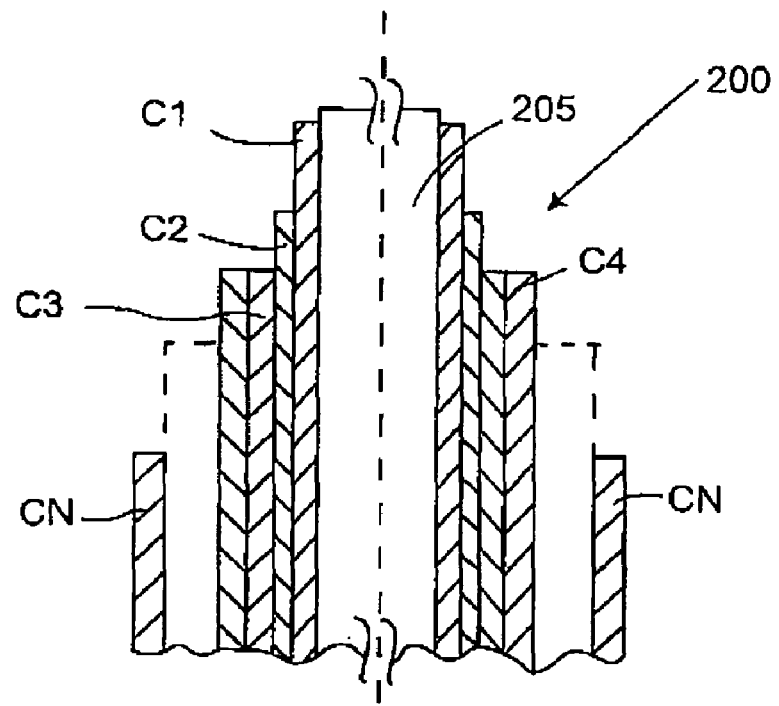
FIG. 7 shows an alternate embodiment of the invention.

The cable 200 can be coated with multiple layers of coating material. In general, each layer need not be the same material. Reference is made to FIG. 7, which shows a treated cable 200 having a plurality of layers of coating material C1-CN. The number and character of each coating layer will vary depending on the desired stiffness of the coated cable 200. For example, the wire rope 20 may be dipped repeatedly in the same coating material and cooled (or permitted to harden between dipping steps). As can be appreciated, each layer of coating applied to the uncoated wire rope 20 (and then the coated wire rope/cable 200) increases the resistance of the treated cable 200 to bending, twisting (or straightening as the case may be). If, for example, a somewhat uniform thickness of coating(s) is desired, the entire wire rope or wire rope segment 20 can be immersed, from end to end in the coating material 204. Various portions of the coated cable 200 can include different thickness of coating layers. It might be beneficial to coat the wire rope or cable segment 200 with multiple or even non-uniform coating layers.

As mentioned above, the preferred coating material is molten solder. Multiple layers of the same solder can be achieved by reducing the immersion time of the cable 200 for subsequent layers of solder. Multiple layers of solder can also be achieved by immersing the cable 20 in various tanks 200-202$n$ of different molten solders. For example, the cable 20 would first be immersed in solder having the highest melt temperature of the solders used. The first solder is permitted to solidify and then the treated cable 200 is immersed in a second solder that has a lower melting point. This process can be repeated as many times as needed. Additionally, as is known, the choice of alloy material(s) used in the solder affects the melt temperature of these alloys and also affects the strength of the solder, providing additional advantages in being able to customize the performance of the coated cable 200. Further, the second and subsequent layers of coating material can be applied differently than the first layer of coating material, for example, it/they can be sprayed or wiped on.

Reference is again made to FIG. 5, which shows a wire rope/cable segment 200 of length A. The top of this cable segment 200 is held by a clamp or a transport clip 206, that can be a part of the process mechanism used to bring the wire rope segment 20 to the processing tank 202 or tanks (see 202$n$). The coating process can be done manually, with the clip 206 replaced by a pair of pliers or other grasping or fastening tool. The wire or cable segment 20 can, for example, be immersed up to a length A1 (see FIG. 5). As mentioned above the wire rope/cable segment can be dipped up to this length A1 any number of times to effect a uniform coating about the entire useful length of the segment 200. During each subsequent coating the wire segment can also be flipped top-to-bottom and reinserted in the holding clip 206 so that the entire segment is coated.

As mentioned above, a wire rope or segment thereof can be used in conjunction with a number of different types of cable terminations such as ferrules, or cooperating, coupling parts, one of which is a seat belt buckle frame. As is known in the art, most metals will, over time, begin to corrode (in general corrosion will include rusting). In the context of an automotive product, each part of this product is made to exacting specifications that include minimizing the rust potential of the part. Consequently, these parts are often treated with an anti-corrosive coating to protect the typically steel part from rusting. For example, automotive parts are often subjected to a salt spray test lasting for about 96 hours. Currently, metal parts are coated with magnesium or zinc phosphate coatings while other parts are coated with conventional plating materials such as nickel and chrome. As can be appreciated each layer of coating material increases the cost of the part. On the other hand, such coatings also increase the useful life of the part. Since most cables are used in conjunction with metal terminations (such as metal ferrules, and other like cable terminations) these metal terminations must also be coated.

The present invention offers added flexibility for the manufacture of cables and cable related parts. For example, rather than incurring the expense of coating each cable terminating mechanism before it is attached to a cable, the uncoated cable terminator can be first attached such as by crimping to an end of the untreated wire rope 20. Thereafter both the cable 20 and its terminating mechanism(s) 40, 44 are dipped into the solder 204.

Reference is again made to FIG. 5. In certain applications it may be desirable to coat the wire rope or cable segment in a non-uniform manner. For example, it may be beneficial to provide a first coating C1 to the wire rope segment by dipping the wire segment length A1 into the coating material in the manner described above. By treating only a portion of the wire rope 20, the remaining, untreated portion retains its original flexibility, and still permits the untreated flexible portion of the rope to be easily inserted or placed about, into or onto a curvilinear surface such as the pulley 82. The next time the segment 200 is dipped, it is only dipped to a length A2 resulting in coating C2 as shown in FIG. 7 (as can be appreciated the relative thickness positions of any of the layers has been greatly exaggerated for the purpose of illustration). As can be seen the top end of the wire segment only has one layer of coating material while the rest of the segment includes multiple coats. The coating layers can be staggered across the length of the segment with various thicknesses of coating C3-CN applied to various portions, which need not be contiguous. The term $A_n$ in FIG. 5 represents the length of the segment that was dipped during the $n^{th}$ dipping cycle. Certain layers can be applied coincident as in the case of layers C3 and C4. The thickness of the coating can be greater at one end of the cable segment 20 or greater in the middle and taper to one or both ends.

Consider the operation of a pretensioner such as shown in FIG. 4 using a coated treated wire rope/cables 200 (as discussed above) as opposed to the uncoated wire rope segment 20. As the piston 68 is forced down the tube 72, the cable 200 is drawn into the pretensioner and, as before, the seat belt buckle 42 is pulled closer to the pretensioner 70. However, a treated, stiffened section of the wire rope or cable 200 is now pulled over the curved pulley 82 (pulley wheel, curved passage, etc.). As the treated wire rope/cable 200 is forcibly pulled about the pulley 82 it will bend. As the stiffened section of the cable 200 bends over the pulley it dissipates energy, the result of which is a reduced level of deceleration to which the seat belt buckle is subjected. As can be seen, energy dissipation is achieved without the use of a crushable tube 90.

An increased or programmed thickness of coating initially adjacent the pulley 82 can be used to control the initial acceleration applied to the buckle 42 while a coated segment near the buckle will control the buckle deceleration.

Figure 8A:
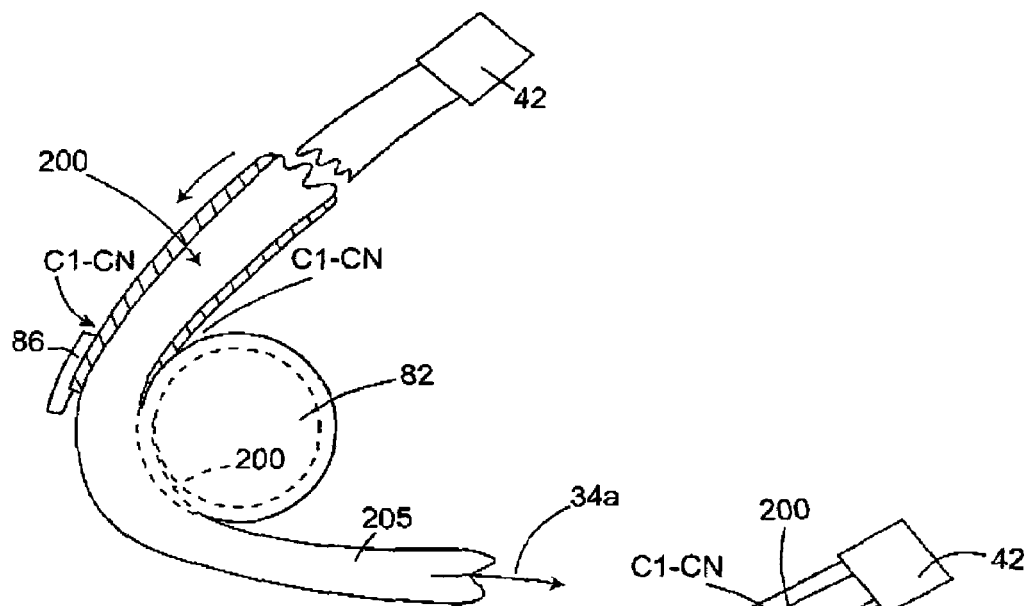
FIGS. 8A and 8B show the use of a coated wire segment within a seat belt tightener.
Figure 8B:
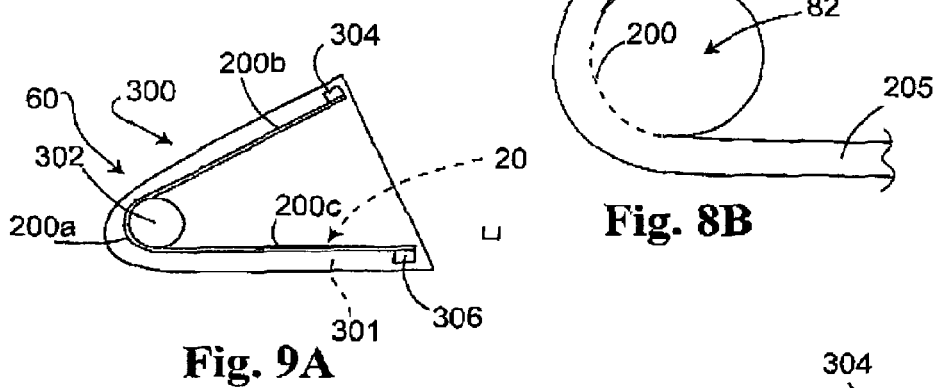

Reference is made to FIG. 8A, which shows one use of the coated wire rope or cable segment 200 positioned about pulley 82 of pretensioner 70. In this embodiment the wire segment is only partially coated. The portion of the wire rope 20 generally below the pulley wheel 82 remains uncoated. The wire rope segment has been placed about the pulley wheel so that the layer or layers of coating C1-CN are placed approximately near the entrance or beginning of a channel 87 located between the guide 86 and the pulley wheel 82. In this configuration any modest amount of movement of the piston 68 (see arrow 34a) will pull the coated cable 200 into (or further into) the narrow channel and about the pulley, absorbing or dissipating energy as the layer or layers of coating and covered wires and strands are deformed. The embodiment shown in FIG. 8B utilizes a larger portion of uncoated wire rope, similar to that shown in FIG. 4, with the coated length of wire rope proximate the seat belt buckle 42. In this embodiment no added energy dissipation occurs until the coating C1-CN contacts or is drawn into the channel 87 between the guide 86 and the pulley wheel 82. The thickness of each layer of coating C1-CN can be varied (more thick closer to the buckle) to change the degree of buckle deceleration, which occurs at or near the end of the range of motion of the piston 34. A typical thickness of coated solder will be in the range from 0.15 µm to about 100 µm.

In the above discussions a straight length of wire is treated in accordance with the present invention. In this embodiment the treated wire segment is formed into an arcuate pre-set configuration and takes advantage of the modular construction of a typical belt tightener such as 70. An advantage of the pre-set configuration is the coated cable 200 can be placed about the pulley wheel 82 as a pre-form, reducing assembly time.

Figure 9A:
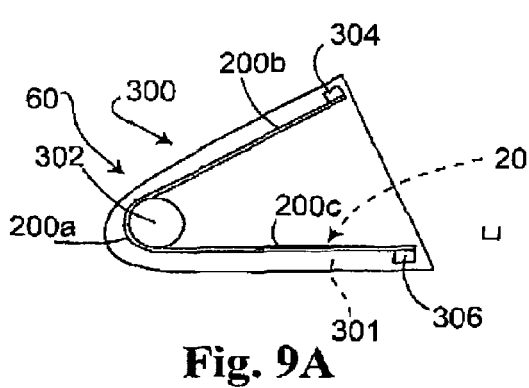
FIGS. 9A, 9B and 9C show an alternate method of treating a wire rope.

FIG. 9A diagrammatically shows a fixture 300 used to shape the untreated cable 20 into a preformed shape. The cable 20 is shown in phantom line in FIG. 9A positioned between various features of the fixture. The fixture includes a pivot or post 302 and stops 304 and 306. The stops can be remote from the post 302 and can also be configured with a hook or clamp to hold respective ends 34 and 36 of the wire segment 60 at a designated angle. The relative angular placement of the stops 304 and 306 and the post 302 are located to replicate the orientation of the cable 20 in the belt tightener 70 (shown in FIG. 4). The stops 304 and 306 are located on lines that extend tangentially from the post, in the manner the wire 20 extends about and exits the pulley 82 (of the pretensioner 70). The post and the stops can be secured to a holding mechanism such as a plate 301 and the wire 20 attached thereto prior to treatment. The stops can also be physically linked to the post 302 (for example see the embodiment of FIG. 9C).

Figure 9B:
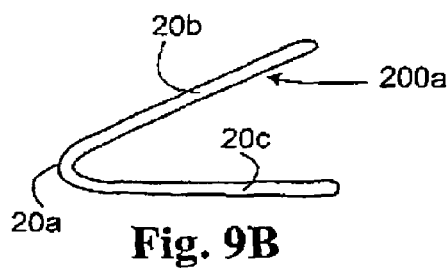

The curvature of the post 302 is the same as the curvature of the pulley 82 and the cable 200 is placed about the post 302 to closely conform to the curvature of the post; the ends of the cable 20 are oriented by and held in place by the stops 304 and 306. The fixture 300, with wire rope segment 20 in place, is lowered in a vat of coating material. In the above example, solder is the coating material of choice, and the fixture 300 including the posts and stops can be made of a ceramic or other material to which solder will not adhere. Subsequently the fixture and cable are removed from the coating material. After the coating material solidifies (the solder sufficiently cools) the coated wire rope segment 200a is removed from the fixture 300. The coating material will maintain the wire rope segment 200a in the preformed shape, see FIG. 9B. The treated, now preformed wire rope segment 200a can be immersed again in the coating material to increase the thickness and/or coverage of coating material thereon. The additional layers of coating material can be added to the cable with the cable in the fixture 300 or with the cable removed from the fixture (since the cable is now in a preformed shape). As before, the coating material can be sprayed, wiped or otherwise applied to the cable.

As can be appreciated, it is not necessary to immerse the entire untreated cable segment 20 in the coating material. For example, only that portion of the fixture 300 and cable 20 in the proximity of the post 302 need be coated for the wire segment 20 to retain a curved shape. With solder applied only to the curved portion of the cable 20 it will retain its curvilinear shape.

Figure 9C:
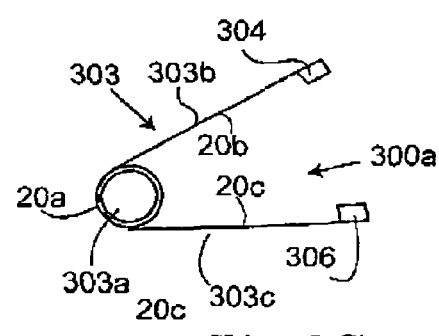

Reference is briefly referred to FIG. 9C, which shows another forming fixture 300a for a cable 20. In this embodiment the fixture 300a is made of a length of wire 303 that is formed into a desired shape thereby avoiding the need for a plate 301. The center of the wire 300 is formed into at least one arcuate wire form, having at least one circular loop 303a formed therein, the ends of the wire 303 are formed as legs 303b and 303c of the wire 303 that extend tangentially from the at least one loop 303a. The legs 303b and 303c are permanently spaced at the desired angular spacing from each other, the angular spacing defined by the orientation the wire would take when in the pretensioner 70. The radius of the loop 303a corresponds to the radius of the pulley 82. Each leg 303b and 303c includes an inwardly directed tab, which forms one of the stops 304 and 306.

In use, a center portion 20a of a segment of cable 20 is centered over the loop 303a and the extending ends 20b and 20c of the wire 20 are bent and positioned adjacent one of the stops 304 and 306. In this configuration the center 20a of the cable 20 will conform to the radius of the curvature of the loop 303a and the ends 20b and 20c of the cable wire 20 will be held from springing outwardly as each end is held in position by a respective stop 304 and 306. The wire 303, which forms this alternate fixture 303a, can be covered in a ceramic or other material inconsistent with using solder. Thereafter, the bent wire 20 is treated with a coating material (such as solder) in a manner as described above and then removed and installed, as a perform, within a pretensioner such as 70.

Reference is made to FIG. 10, which shows a portion of a pretensioner (belt tightener) 70 and more specifically the bracket section 75 (pulley housing). The pulley 82 has been removed from the bracket 75 but its location is shown by phantom line 82. The treated, preformed, curved segment of cable 200a (described above) is fitted onto the bracket 75 and placed against the stops 86 and the apex of the curve is placed at the desired location of the pulley 82. With the cable 200a in place on the bracket, the pulley 82 is secured to the bracket 75 holding the cable in place. In this embodiment, the coating material 204 (solder) extends below the pulley (in the direction of the piston) and sufficiently up toward the buckle 42 (not shown) to provide the needed length of coating for energy absorption.

Reference is briefly made to FIG. 11A, which illustrates an alternate method of treating the wire rope/cable segment 20. In this embodiment an untreated segment of cable 20 is bent into a generally U-shape configuration and inserted or held within a clamping fixture 220 to retain this configuration. Thereafter, the cable 20 (and as needed the fixture 220) is moved into the liquid 204. The treated or coated portion of the cable 20 is shown by numeral 200b, the layer of coating is designated by symbol C1. As can be appreciated, this method of treating the segment 20 stiffens only that portion of the cable 20 that has been treated; in this case the medial portion 250 of the segment 20 is located generally at the center of the cable 20. Using the above process the ends 34, 36 of the wire segment 20 are not embedded within covering material 204 unless the fixture is also immersed in the coating material.

Reference is made to FIG. 11B, which shows one use of the U-shaped wire segment 200b. FIG. 11B shows a rear seat assembly 360 of a vehicle with seat back 362 and seat cushion 364. The seat assembly 360 defines two seating positions 365a and b. The seat assembly 360 can be a bench seat or multiple bucket seats. It is accepted practice to mount two seat belt buckles 42 on one untreated segment of cable such as 20. In this alternate embodiment, a treated section of wire cable 200b can be mounted via anchors 370 to the vehicle floor with the buckles 42 secured to the ends of the wire segment 200b. The coated center portion 201a of the coated cable segment 200b is configured to conform to the floor of the vehicle and can be straight or curved, while the coated extending legs 201b and 201c of the cable segment 200b are bent into a desired shape to present, that is to orient, the buckles 42 at the desired orientation for the vehicle occupant. As mentioned above, a coated segment of cable 200b can be bent into a desired shape and it will hold this shape. Additionally, no added support is needed for the buckle support segments 201b and 201c, which would have been provided in the prior art by a plastic sleeve. As is typical of seat belts for rear seats of vehicles, the seat belt buckles 42 extend out from the space between the seat cushion and the seat back.

Reference is briefly made to FIG. 12, which shows an alternate method of exposing a section of untreated cable 20 to the coating liquid 204. The liquid, heated solder or other liquid coating material is forced through nozzles or spray heads generally shown as 380 and sprayed on or injected upon the segment of the wire cable 20 to be treated. One or the other of the cable or the spray heads can be relatively movable one to the other. One of the advantages of this method of coating is there is no practical limit on the length of wire rope that can be coated, and cable delamination (unwinding of the stands or wires) during cutting is eliminated.

Reference is made to FIG. 13, which shows another alternate of the invention. In this embodiment the seat belt buckle 42 is connected to anchor 44a by a length of flexible seat belt webbing 400. The top of the seat belt 400 is formed into a first loop 402, which is looped, in a conventional manner, through an opening and about a bar 404 associated with the buckle 42 or buckle frame; the loop is sewn closed. The other end of the seat belt is also formed into another loop 406, which is received through another opening and about a bar 408 associated with the anchor 44a and sewn closed. The above configuration is standard in the industry and represents an alternate to attaching the buckle to the anchor via a wire cable 20 as shown in FIG. 3. Additionally, in this configuration the seat belt webbing 400 is very flexible and the seat belt webbing is often threaded through a sleeve such as 52 (see FIG. 3) to stiffen the overall configuration prior to attachment to both the anchor and the buckle. As is known, seat belts are made of a woven construction of intersecting weft and warp fibers Small openings 410 exist at the intersection of each of these fibers. In the present invention the seat belt webbing 400, the lower portion 412 of the buckle 42 and the upper portion 414 of the anchor 44a are coated with a flexible, durable material 420 including a flexible silicon rubber, urethane resin or vinyl such PlastiDip® to increase the rigidity, i.e. make the seat belt webbing less flexible. The material chosen makes the seat belt webbing 400 sufficiently rigid so it (the seat belt) can support its own weight and the weight of the buckle and anchor, and will not bend but is still sufficiently flexible to be bent and twisted under larger applied forces.

Many changes and modifications in the above-described embodiment of the invention can, of course, be carried out without departing from the scope thereof. Accordingly, that scope is intended to be limited only by the scope of the appended claims.

The invention claimed is:

1. A seat belt system comprising:
 a composite cable assembly comprising a flexible cable having a first and a second end, one of the first and second ends connectable to a first mechanism and the other of the first and second ends connectable to a second mechanism, the cable comprising at least one single strand of wires, each strand having intra-wire spaces and a fill material consisting of fusible metal or metal alloy, the fusible metal or metal alloy disposed within intra-wire spaces along a first length of the at least one strand, the fusible metal or metal alloy when hardened increasing the amount of energy needed to bend the coated portion of the cable in comparison to an uncoated portion of the cable.

2. A seat belt system comprising:
 a composite cable assembly comprising a flexible cable having a first and a second end, one of the first and second ends connectable to a first mechanism and the other of the first and second ends connectable to a second mechanism, the cable comprising at least one single strand of wires, each strand having intra-wire spaces and a fill material consisting of molten solder, the molten solder disposed within intra-wire spaces along a first length of the at least one strand, the fill material after being coated on the cable is configured to harden so as to change the amount of energy needed to bend that portion of the cable coated with fill material in comparison to an uncoated portion of the cable;
 wherein the first mechanism to which the cable is connected includes a housing having a movable piston associated with a pretensioner and the second mechanism to which the cable is connected is one of a buckle and a buckle-connecting member, wherein the coated portion of the cable, prior to activation of the pretensioner, is remote from the housing.

3. The system as defined in claim 2 wherein the molten solder comprises tin that spreads through intra-wire spaces in the cable and which covers the wires and wherein the molten solder upon solidifying is pliable.

4. The system as defined in claim 2 wherein the fill material also covers the exterior of the cable and is of a predetermined thickness.

5. The system as defined in claim 4 wherein the molten solder upon cooling has a predetermined thickness over the coated portion of the cable, and wherein the energy needed to bend the coated portion of cable is greater than the energy needed to bend the uncoated portion of the cable.

6. The system as defined in claim 2 wherein the fill material includes a) an alloy comprising molten: lead, tin, silver, bismuth, copper or antimony.

7. A seat belt system comprising:
 a composite cable assembly comprising a flexible cable having a first and a second end, one of the first and second ends connectable to a first mechanism and the other of the first and second ends connectable to a second mechanism, the cable comprising at least one single strand of wires, each strand having intra-wire spaces and a fill material consisting of molten solder, the molten solder disposed within intra-wire spaces along a first length of the at least one strand, the fill material after being coated on the cable is configured to harden so as to change the amount of energy needed to bend that portion of the cable coated with fill material in comparison to an uncoated portion of the cable;
 wherein the cable is configured as a component of a buckle pretensioner, the pretensioner including a curved path about which the cable is pulled, one end of the cable extending from the pretensioner connected to a buckle, and wherein the fill material is located upon the cable at least between the curved path and the buckle, wherein movement of the coated portion of the cable about the curved path decelerates movement of the cable.

8. The system as defined in claim 7 wherein the cable assembly includes a plurality of strands with intra-strand spaces between each strand.

9. The system as defined in claim 8 wherein the fill material fills intra-wire spaces as well as the intra-strand spaces.

10. A vehicle occupant restraint system, including:
 a seat belt pretensioner comprising
  a curved cable guide and a flexible wire cable, the wire cable configured to be slidably movable through the cable guide about an arcuate path defined by the cable guide, the wire cable having a first portion arranged along a first direction in relation to the cable guide, a second portion arranged along a second direction in relation to the cable guide, the first and second directions spaced apart by an acute angle, the wire cable includes a third portion initially bent about the arcuate path of the cable guide, the wire cable configured so that as the first portion is moved in the first direction the second portion is moved toward and in contact with the arcuate path that was initially taken up by the third portion, the wire cable including stiffening means applied to the second portion of the wire cable, for making the second portion of the wire cable more difficult to bend in comparison to other portions of the wire cable remote from the stiffening means;
 and wherein the stiffening means includes a solder that spreads through intra-wire spaces in the cable and which covers exposed surfaces of the wire cable and wherein the solder comprises tin configured to remain pliable within a temperature range of −40 degrees F. and 120 degrees F.

11. A vehicle occupant restraint system, including:
 a seat belt pretensioner comprising
  a cable guide defining a curved path;
  a flexible composite cable disposed about the curved path of the cable guide, the composite cable comprising at least one strand of wires, the wire strand having intra-wire spaces, and an energy dissipating coating filling the intra-wire spaces, wherein a portion of the at least one wire strand is dipped in a solder which flows in the intra-wire spaces, the solder later, in time, hardening about the cable;
  first means for moving the cable about the curved path of the cable guide;
 wherein the at least one wire strand has a determinable level of rigidity in uncoated solder regions, wherein the solder is configured to increase the level of rigidity of the cable in solder coated regions compared to the rigidity of uncoated regions thereby taking more energy to bend the coated regions of the cable about the cable guide in response to movement of the first means, the bending of the solder coated regions of the cable generating a force tending to retard the motion of the first means.

12. The system as defined in claim 11 wherein the energy dissipating coating is applied to a selected portion of the cable between the cable guide and a seat belt buckle.

13. The system as defined in claim 12 wherein the coating is within a portion of the wire strand cable initially positioned in the vicinity of the cable guide.

14. A vehicle occupant restraint system, including:
a seat belt pretensioner comprising
a curved cable guide, a flexible wire cable slidably movable through the cable guide about an arcuate path defined by the cable guide, and a powered mechanism for moving the cable, the flexible wire cable having a first portion arranged along a first direction, a second portion arranged along a second direction, the first and second directions separated by an acute angle, the flexible wire cable including a third portion bent about the arcuate path of the cable guide, the flexible wire cable configured so the first portion can be moved in the first direction by the powered mechanism, thereby causing the second portion to move into contact with the arcuate path initially taken up by the third portion, and urging the second portion to move about at least a portion of the arcuate path, a coating achieved by dipping the flexible cable in a liquid fusible metal or metal alloy, such dipped coating located at least on a portion of the second portion of flexible wire cable adjacent the cable guide, such coating excluding a metal tube about at least a portion of the cable, the dipped coating configured to increase the stiffness of the flexible wire cable to bending in comparison with an uncoated portion of the wire cable, the coated portion of the wire cable brought into contact with the cable guide as the flexible wire cable is moved creating a force tending to decelerate movement of the flexible wire cable.

15. The systems according to claim 14 wherein a portion of the third portion of the wire cable is coated with a solder.

* * * * *